Jan. 19, 1960     O. R. SMITH     2,922,103
ELECTRICAL RESISTIVITY DETERMINATION OF WELL BORE FLUIDS
Filed July 27, 1956

INVENTOR.
Orville R. Smith,
BY *Earl Babcock*
ATTORNEY.

United States Patent Office 2,922,103
Patented Jan. 19, 1960

2,922,103

ELECTRICAL RESISTIVITY DETERMINATION OF WELL BORE FLUIDS

Orville R. Smith, Houston, Tex., assignor, by mesne assignments, to Welex, Inc., a corporation of Delaware Application July 27, 1956, Serial No. 600,424

5 Claims. (Cl. 324—2)

This invention generally relates to the electrical logging of well bores, and more particularly relates to an improved arrangement for measuring the electrical resistivity of a well fluid where situated in a well bore.

When making electrical resistance logs of well formations, the resistivity of the well bore fluid is commonly known to be a considerable factor in the interpretation of such logs. Various means have been employed to determine the resistivity of such fluid. Probably the most common are sampling devices which measure specimens of the fluid taken from the mud pits. The fluid throughout the well bore is then assumed to be homogeneous and of the resistivity thus measured. Resistivity logs of the particular well bore are then interpreted in view thereof.

However, it is recognized that the fluid situated through the well bore is not always of the same resistivity. A common cause for this resistivity variation is the increasing temperatures encountered with increasing depth in a well bore. Some resistivity variation may be caused by dilution of the well fluid with fluids found in surrounding formations such as brine or fresh water. Also, since the well fluid is not circulated during logging operations, some variations might be attributed to its thickening or to stratification of suspended drilling cuttings.

Arrangements have been provided to measure resistivity of such fluid where it is situated. One of such arrangements is a closely spaced potential system having two potential electrodes positioned between two current electrodes, said electrodes all being openly immersed in the well fluids. However, such an arrangement is responsive to the well bore diameter and adjacent formation resistivity to some extent. Such response is caused by a deviating and indeterminate path of current flow between the current electrodes. Thus, when such diameter or formation exhibits considerable change, a deviation in measurement may be indicated while the well fluid resistivity actually remains constant.

It is therefore the principal object of this invention to provide a mud resistivity measuring structure which will definitely account for and control the electrical current passing through the well fluid to be measured and provide a fluid resistivity measure of fairly great accuracy.

It is also an object of this invention to provide accurate and reliable detecting, signalling, and recording apparatus to be used in combination with such measuring arrangement.

In accordance with the present invention, there is provided an improved arrangement for measuring the electrical resistivity of subsurface fluid where encountered in a well bore. The arrangement consists of an open insulating sleeve which is adapted to pass both through and around the fluid found in a well bore. Located within said sleeve are three selectively positioned current electrodes and two selectively positioned potential electrodes. One of said current electrodes is of a first potential and positioned between the other two of said current electrodes which are commonly connected to an opposed potential. A current generating means provides current through the well fluid passing through said sleeve which passes between said first current electrode and both of the other of said current electrodes in proportion to their relative position with respect to said first current electrode. Two potential electrodes selectively positioned with respect to one another are provided within said sleeve and located between said first current electrode and one of the other two current electrodes. Potential detection means is provided to determine the potential difference between said potential electrodes being caused by the fluid resistivity to the current flow between said current electrodes.

In a preferred embodiment of the invention, the detected potential is relayed to the earth's surface for indication or recording by a frequency modulated signalling means.

For further objects and advantages of the invention, and for a more complete description thereof, reference may now be had to the following description taken in conjunction with the accompanying drawing in which.

Figure 1:
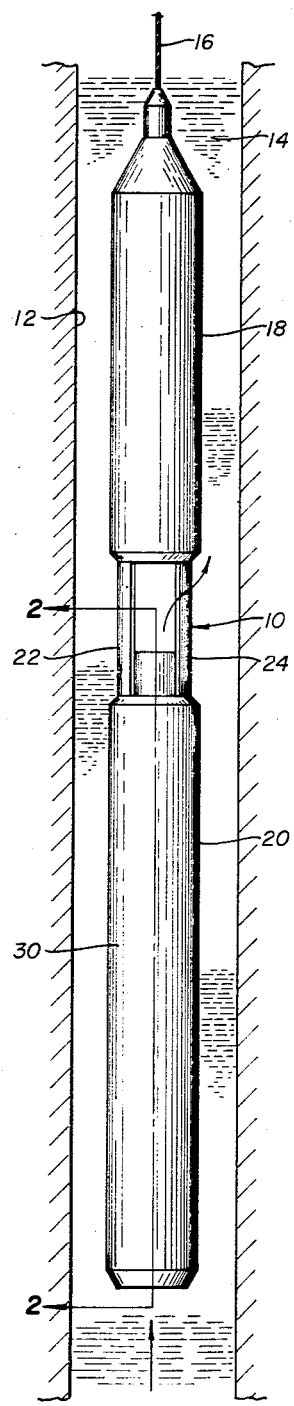
Figure 1 shows a sectional elevation of a well bore in which an embodiment of the invention is inserted.

Referring to the drawing in detail and first to Figure 1, there is illustrated a well bore 12 containing a well fluid 14. As provided by this invention, a logging tool 10 is inserted in bore 12 and adapted to be raised or lowered therein by means of a cable 16. Said cable is connected to suitable hoisting equipment at the earth's surface which, being familiar to those skilled in this art, is not herein illustrated.

The tool 10 has an upper case 18 which is provided for enclosure of detection and signalling apparatus as herein later described. A lower housing 20 is attached to the case 18 by means of support members 22 and 24. As illustrated, the upper end of housing 20 is in open communication to the bore fluid 14.

Figure 2:
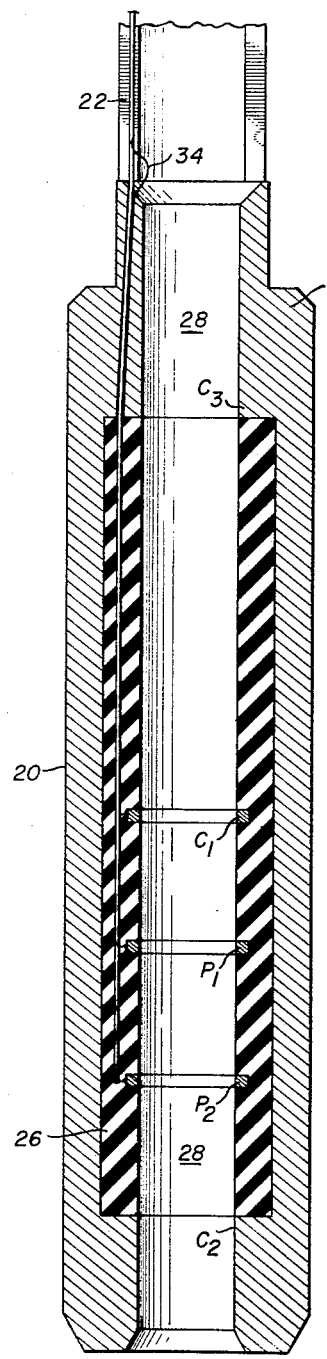
Figure 2 shows a cross-sectional view illustrating the structure of a preferred embodiment of the invention.

Now referring to Figure 2, housing 20 contains and forms a part of cell 30. An axial bore 28 of constant diameter extends entirely through cell 30. Thus, a free flow of fluid is permitted through said cell in either direction. An insulating sleeve 26 is provided within housing 20 and forms an intermediate segment of bore 28. Said sleeve may be made of any firm, impermeable, and insulating material, hard rubber being an example found to be satisfactory.

A current electrode $C_1$ is provided in sleeve 26 and positioned in such manner that electrical contact may be had thereto only within bore 28. Current electrodes $C_2$ and $C_3$ are provided at either end of sleeve 26. For convenience, electrodes $C_2$ and $C_3$ have been provided by the extension of bore 28 through the ends of metallic housing 20. It is easily seen however, that these electrodes may be provided of construction similar to electrode $C_1$ and be located within sleeve 26 near the ends of said sleeve. Thus, the entire measuring cell 30 could be within sleeve 26 if such were desired. A pair of potential electrodes $P_1$ and $P_2$ are provided within sleeve 26 and between current electrodes $C_1$ and $C_2$, and also positioned in such manner that electrical contact may be had with said potential electrodes only within bore 28.

Current electrode $C_1$ is herein illustrated as being equidistant from current electrodes $C_2$ and $C_3$. Potential electrodes $P_1$ and $P_2$ are illustrated herein as being in spaced relation to one another and equidistant from current electrodes $C_1$ and $C_2$. As later explained, such spacings are herein selected for ready and simple illustration of the invention and may be changed somewhat with no loss of utility. Also pointed out is that potential electrodes $P_1$ and $P_2$ may be positioned between current electrodes $C_1$ and $C_3$ with equal utility if desired.

Figure 3:
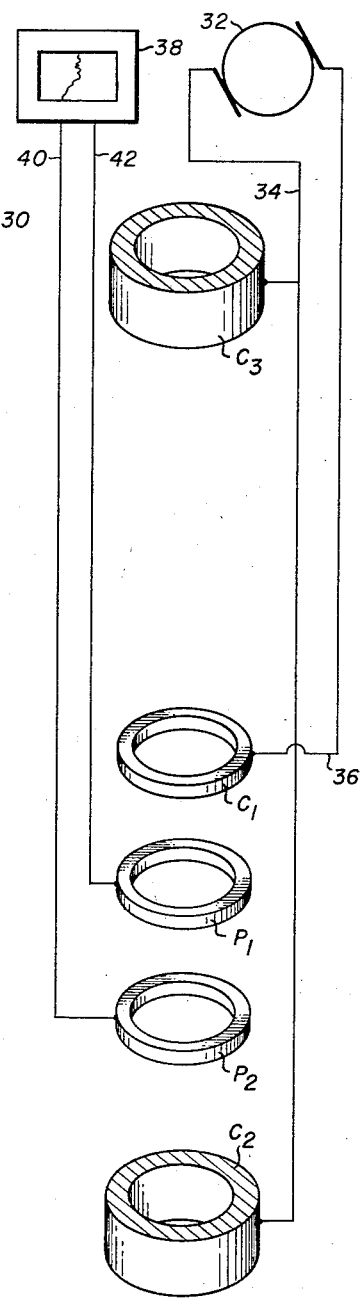
Figure 3 shows a schematic embodiment of the invention.

As seen in Figures 2 and 3, current electrodes $C_2$ and $C_3$ are electrically connected in common. In Figure 3 said electrodes are shown connected to a current generator 32 by a connector 34. Current electrode $C_1$ is also connected in opposite potential to the current generator 32 by a connector 36. In operation, the circuit is completed by current flow through the fluid found in bore 28 of cell 30. It is pointed out that all current flow must occur within bore 28, since no potential difference exists outside said bore.

When the fluid specimen contained within sleeve 26 is substantially electrically homogeneous, the current flow through the fluid specimen from electrode $C_1$ will flow to electrodes $C_2$ and $C_3$ in a proportion inverse to the relative distance of each to electrode $C_1$. Thus, for illustration, electrodes $C_2$ and $C_3$ are provided equidistant from electrode $C_1$ to provide equal current flow to each.

The potential drop across potential electrodes $P_1$ and $P_2$ is a function of the total resistance of the fluid therebetween and the current flowing between electrodes $C_1$ and $C_2$. It is therefore necessary to determine the current flowing between said current electrodes in addition to determining the potential across electrodes $P_1$ and $P_2$. While such current may be concurrently determined by common means it has been found more convenient to provide a current generator which will supply a known and constant current between said current electrodes. Current generator 32, as described herein, supplies such a known and constant current.

As previously described, the spacing of the current electrodes governs the proportion of current flow between said electrodes. It is additionally pointed out that the diameter of bore 28 and the spacing of potential electrodes $P_1$ and $P_2$ in said bore will govern the volume of fluid across which the potential drop will be determined. Thus, the potential detected will be in response to the total resistance of such a volume. A conversion factor may then be applied to convert such resistance to the resistivity units commonly used in this art. In a very successful embodiment such as that illustrated in the attached drawing, a sleeve 26 is provided which is twelve inches in length and has a bore 28 diameter of two inches. Current electrode $C_1$ is provided midway between current electrodes $C_2$ and $C_3$. Potential electrodes $P_1$ and $P_2$, which are spaced two inches apart, are provided midway current electrodes $C_1$ and $C_2$.

The fluids contained within the sleeve 26 must be substantially homogeneous in electrical resistivity to effect the measurements herein described. The overall dimensions determine the accuracy of the resistivity measurement during abrupt transitions in fluid resistivity. The dimensions given are adequate for the resistivity transitions normally found in well bores.

Potential electrodes $P_1$ and $P_2$ are connected to a detecting and recording means 38 by connectors 40 and 42. If a sufficient number of conductors is provided in cable 16, the detection and recording of such potential may be done entirely at the earth's surface by means known to those skilled in this art. Current generator 32 may also be provided at the surface. It has been found, however, that excellent drift free logs are made wherein detection, current generation, and frequency modulated telemetering circuits are provided in the tool proper (the case 18, as herein illustrated). When so provided the cable 16 need have only one conductor therein which serves to carry power down to the tool 10 and carry intelligence signals from said tool to the earth's surface. A system using frequency modulated signals such as employed herein is clearly disclosed in Patent No. 2,573,133 to Greer. The cell 30 may be used in conjunction with the resistance logging system disclosed therein and provides a valuable additional reference curve thereto as herein described.

Briefly described, such a system detects and amplifies the potential occurring between electrodes $P_1$ and $P_2$. A modulator circuit then modulates a control oscillator in response to said detected potential which is operating at a particular carrier frequency, for example, 10.5 kc. The output signal of said oscillator then passes through a matching section into the conductor of cable 16 and thence to the earth's surface. At the surface the signal passes through a band pass filter to a discriminator circuit for subsequent discrimination and recording. Several of such frequency modulated signals, each at its respective carrier frequency, may be concurrently transmitted over cable 16.

In operation, the raising or lowering of tool 10 in the well fluid 14 causes a portion of said fluid at any particular depth to pass through the bore 28. Current generator 32 forces a current of known and constant magnitude, for example, 10 milliamperes at 400 cycles, from current electrode $C_1$ through the fluids in bore 28 to current electrodes $C_2$ and $C_3$. Thus, the current between current electrodes $C_1$ and $C_2$ will be 5 milliamperes. The potential resulting from the resistance of the fluid between electrodes $P_1$ and $P_2$ is then detected. In the embodiment heretofore described the variation of such potential modulates a suitable carrier signal, for example, 10.5 kc., which is transmitted to the earth's surface and recorded. Simultaneously there may be various other resistance or induction measures taken for joint recording.

It is pointed out that the electrodes which are herein illustrated as rings could suitably be of other configuration. Rings, as illustrated, were chosen in order to reduce flow resistance within bore 28.

While only one embodiment of the invention has been shown and described herein, it is obvious that various changes may be made without departing from the invention or the scope of the annexed claims.

That which is claimed is:

1. Apparatus for determining the electrical resistivity of fluid found at varied depths in a well bore which includes in combination, an open sleeve of insulating material which is adapted to allow passage of fluid through said sleeve upon movement of said sleeve through a well bore, a first current electrode located at the first end of said sleeve, a second current electrode located within said sleeve in spaced relation to said first current electrode, a third current electrode located at the second end of said sleeve in spaced relation to said second current electrode, said first and third current electrodes being electrically connected in common, current generating means for driving a known current through said fluid which may flow only between said second current electrode and said first and third current electrodes, a pair of potential electrodes located in spaced relation to one another and in spaced relation between any two of said current electrodes so as to be in the path of a known portion of said current flow, and means for measuring the potential drop occurring in proportion to the resistivity of said fluid to said current flow between said potential electrodes.

2. Apparatus for determining the electrical resistivity of fluid found at varied depths in a well bore which includes in combination, an open sleeve of insulating material which is adapted to allow passage of fluid through said sleeve upon movement of said sleeve through a well bore, a first current electrode located at the first end of said sleeve, a second current electrode located within said sleeve in spaced relation to said first current electrode, a third current electrode located at the second end of said sleeve in spaced relation to said second current electrode, said first and third current electrodes being electrically connected in common, current generating means for driving a known current through said fluid which may flow only between said second current electrode and said first and third current electrodes, a pair of potential electrodes located in spaced relation to one another and in spaced relation between any two of said current electrodes, so as to be in the path of a known portion of said current flow, potential detection means for detecting the potential drop occurring between said potential electrodes, frequency modulation signalling means in connection with said potential detection means for transmitting said detected potential to the surface of the ground, and recording measurement means connected to said signalling means for measuring and recording said detected potential.

3. Apparatus for determining the electrical resistivity of fluid found at varied depths in a well bore which includes in combination, an open sleeve of insulating material adapted for longitudinal movement in a well bore containing a fluid to be measured, a first current electrode located within said sleeve, a second current electrode located in said sleeve and selectively spaced from said first current electrode, said first electrode and said second electrode being of common electrical potential, a third current electrode located in said sleeve and selectively spaced between said first and second current electrodes, said third current electrode being of opposite electrical potential to said first and second current electrodes, and a first and a second potential electrode located in said sleeve, each of said potential electrodes being selectively spaced relative to the other and both being selectively spaced between said first current electrode and said third current electrode, constant current generating means connected to said third current electrode and commonly connected to said first and second current electrodes for generating a current through said fluid which may flow only from said third current electrode to each of first and second current electrodes in known magnitude proportional to the respective spacing of each of said first and second current electrodes to said third current electrode, and potential detection means connected to said potential electrodes for detection of a potential occurring in known relation to the electrical resistivity of the fluid between said potential electrodes to said known current.

4. Apparatus for determining the electrical resistivity of fluid found at varied depths in a well bore which includes in combination, an open sleeve of insulating material adapted for longitudinal movement in a well bore containing a fluid to be measured, a first current electrode located within said sleeve, a second current electrode located in said sleeve and selectively spaced from said first current electrode, said first electrode and said second electrode being of common electrical potential, a third current electrode located in said sleeve and selectively spaced between said first and second current electrodes, said third current electrode being of opposite electrical potential to said first and second current electrodes, and a first and a second potential electrode located in said sleeve, each of said potential electrodes being selectively spaced relative to the other and both being selectively spaced between said first current electrode and said third current electrode, whereby all current flow between said current electrodes will be confined within said sleeve and will flow from said third current electrode to each of said first and second current electrodes in known magnitude proportional to the respective spacing of each of said first and second current electrodes to said third current electrode, and the potential existing across said potential electrodes will be in known relation to the electrical resistivity of said fluid.

5. Apparatus according to claim 4 wherein said existing potential is detected by potential detection means, said potential detection means being connected to a frequency modulation signalling means including a modulator which modulates a carrier frequency oscillator in response to the magnitude of said detected potential and discrimination means which discriminates said signal from said carrier frequency, and recording measurement means connected to said signalling means for measuring said discriminated signal.

References Cited in the file of this patent

UNITED STATES PATENTS

| 2,330,394 | Stuart | Sept. 28, 1943 |
| 2,599,413 | Reichertz | June 3, 1952 |